United States Patent
Wiltz

(10) Patent No.: US 6,439,314 B1
(45) Date of Patent: Aug. 27, 2002

(54) AQUA BOOT FOR HORSES

(76) Inventor: William G. Wiltz, 4626 Koerner Rd., Peoria, IL (US) 61615

( * ) Notice: Subject to any disclaimer, the term of this patent is extended or adjusted under 35 U.S.C. 154(b) by 0 days.

(21) Appl. No.: 09/736,154

(22) Filed: Dec. 15, 2000

Related U.S. Application Data

(60) Provisional application No. 60/227,361, filed on Aug. 24, 2000.

(51) Int. Cl.[7] .............................. A01L 15/00; A01L 3/00
(52) U.S. Cl. ............................................. 168/2; 168/18
(58) Field of Search ..................... 168/1, 2, 18; 54/82; 119/850, 856, 860

(56) References Cited

U.S. PATENT DOCUMENTS

| | | | |
|---|---|---|---|
| 167,805 A | 9/1875 | Hall | 168/18 |
| 414,752 A | 11/1889 | Chapman | 54/82 |
| 665,530 A * | 1/1901 | Johnson | 54/82 |
| 719,687 A * | 2/1903 | Nickerson | 168/2 |
| 1,043,978 A * | 11/1912 | St. John | 168/2 |
| 2,163,361 A * | 6/1939 | Ford et al. | 168/2 |
| 3,119,219 A | 1/1964 | Cohen | 54/82 |
| 3,794,119 A | 2/1974 | Paiso et al. | 54/82 |
| 4,548,026 A | 10/1985 | Shidner | 54/82 |
| 5,152,285 A | 10/1992 | Gnegy | 54/82 |
| 5,224,549 A | 7/1993 | Lightner | 168/18 |
| 5,441,015 A * | 8/1995 | Farley | 54/82 |
| D365,894 S | 1/1996 | Davis | D30/146 |
| 5,600,940 A | 2/1997 | Rice | 54/82 |
| 5,816,032 A | 10/1998 | Vogt | 54/82 |
| 5,871,458 A | 2/1999 | Detty | 602/27 |

FOREIGN PATENT DOCUMENTS

| | | |
|---|---|---|
| FR | 2 546 373 A | 11/1984 |
| GB | 2 241 632 A | 9/1991 |

* cited by examiner

*Primary Examiner*—Charles T. Jordan
*Assistant Examiner*—Elizabeth Shaw
(74) *Attorney, Agent, or Firm*—Richard C. Litman

(57) ABSTRACT

The aqua boot for horses is a device which is designed for rehydration of a horses hoof in order to prevent excessive dryness and cracking of the hoof. The boot is a structured sponge or plastic foam wrap having an inside shoulder for attaching to and conforming to a dehydrated hoof of a horse. The boot is a layer of absorbent foam or sponge material having apertures, adhered to a rubber or vinyl backing material with mating strips of hook and loop fastening material attached to opposite ends of the sponge or foam so that the boot may be wrapped around the horse's hoof. The foam or sponge layer is soaked in water, ice or other moisturizing liquid, lotion, or gel, and wrapped about the hoof with the sponge layer in contact with the hoof.

6 Claims, 3 Drawing Sheets

AQUA BOOT FOR HORSES

CROSS-REFERENCE TO RELATED APPLICATION

This application claims the benefit of U.S. Provisional Patent Application Serial No. 60/227,361, filed Aug. 24, 2000.

BACKGROUND OF THE INVENTION

1. Field of the Invention

The present invention relates generally to a rehabilitative wrap for horses. More specifically, the invention is a sponge containing wrap device for attaching to a hoof for rehydration off the coronet region and below the coronet region.

2. Description of Related Art

With insufficient moisture, a horse's hoof becomes dry and cracked. Absorption of water by the hoof keeps the hoof supple and elastic. The present invention is directed to a boot which is designed to restore moisture to the horse's hoof, and particularly to the coronary band, perioplic corium, bulbs, hoof wall, and plantar cushion (frog).

The related art of interest describes various protective boots for horses, but none discloses the present invention. There is need for a simplified and economical wrap for hydration of a dehydrated coronet region of a horse. The related art will be described in the order of perceived relevance to the present invention.

U.S. Pat. No. 4,548,026 issued on Oct. 22, 1985, to Morris I. Shidner describes an equidae coronet boot to protect the coronet and offer a decorative colored effect of a horse's hoof, comprising an elastomeric foam layer sandwiched between layers of nylon cloth. The flat right circular trapezoidal shape is cross-sewn and edged with cloth tape. The boot has hook and loop fasteners. The boot is distinguishable for its colored trapezoidal shape and multiple layers including a foam layer designed for longer life from use in rodeos and not for rehydration of the coronet region as in the present invention.

U.S. Pat. No. 5,600,940 issued on Feb. 11, 1997, to Winston Rice describes an apparatus for applying lotion to a hoof comprising a conical body having an absorbent lining and a non-absorbent exterior layer covering the entire hoof with hook and loop fasteners, belt and buckle or snap fasteners. The apparatus is distinguishable for its lack of identification of the compositions of the interior and exterior layers and the non-recognition of aqueous hydration of the coronet region.

U.S. Pat. No. 167,805 issued on Sep. 21, 1875, to John B. Hall describes a horse boot comprising a sponge for glycerine and an outer layer comprising leather, cloth, rubber or other flexible material and fastened by three belts with buckles. The horse boot is distinguishable for covering the entire hoof for moistening and failing to recognize the need for aqueous hydration of the coronet region.

U.S. Design Pat. No. 365,894 issued on Jan. 2, 1996, to Brian Davis describes a flat right circular trapezoid shape with hook and loop fastener straps for protecting a hoof. The boot is distinguishable for its distinctive shape and different protective function.

U.S. Pat. No. 414,752 issued on Nov. 12, 1889, to George T. Chapman describes a bandage for veterinary use on a hoof or head. A circular rubber bandage comprising a middle portion of a flexible web for accepting a poultice and outer ends having a smaller width. The bandage is distinguishable for lacking an absorbent quality.

U.S. Pat. No. 3,119,219 issued on Jan. 28, 1964, to Bernard Cohen describes a protective quarter boot for the front feet of a horse because of damage inflicted by an opposite front hoof. The rubber boot ring has walls at the sides and rear which are highest. The rear wall has recesses on the inside surface to accommodate the bulbs of flesh behind the hoof. The inside lower edge of the rear wall has an inward projection to fit into the cleft of the hoof. The quarter boot is distinguished by its unique shape for remaining in place.

U.S. Pat. No. 3,794,119 issued on Feb. 26, 1974, to Al Paiso et al. describes a horse shoe made from rubber to fit the hoof with an apertured and ribbed bottom surface and three hook fastening regions. A sling with a loop fastening surface is used to confine the horse shoe on the hoof. The horse shoe is distinguishable for its structure to fit the entire hoof.

U.S. Pat. No. 5,152,285 issued on Oct. 6, 1992, to Brian D. Gnegy describes a therapeutic boot for applying heat or cold to a horse leg comprising two leather or vinyl U-shaped panels with inside pockets for hot or cold packs which are fastened by hook and loop patches. The therapeutic boot is distinguishable for its structure requiring inside pockets.

U.S. Pat. No. 5,224,549 issued on Jul. 6, 1993, to Amy Lightner describes a boot-type shoe for horses including a relatively rigid cleated sole member of urethane, a flexible foamed neoprene sleeve affixed to the sole member and extending upwardly therefrom to cover the front portion of the hoof, and an arrangement for securing the first sleeve in engagement with a second neoprene sleeve to retain the shoe on the hoof by hook and loop patches. The boot-type shoe is distinguishable for its two-part structure to cover the entire hoof.

U.S. Pat. No. 5,871,458 issued on Feb. 16, 1999, to Gerald D. Detty describes an equine ankle brace system comprising two or three neoprene layers held by hook and loop straps to hold the heat emitted by the horse. Each layer has hook and loop patches for attaching to each other. The ankle brace system is distinguishable for its multiple neoprene rubber layers.

U.S. Pat. No. 5,816,032 issued on Oct. 6, 1998, to Les Vogt describes a protective support wrap for a horse leg comprising a smoking pipe-shaped panel with three hook and loop straps and two vertical tendon support rolls on the inside surface. The support wrap is distinguishable for its unique structure requiring tendon support rolls.

French Patent Application No. 2,546,373 published on Nov. 11, 1984, for Isabelle Lestrade describes a gaiter used as a moistened compress for a horse's leg. The gaiter comprises three layers beginning with the internal layer: (1) soft thick flannel, cotton, velveteen or absorbent cotton; (2) plastic foam; and (3) Jersey cloth or a perforated and plasticised linen cloth. The equestrian rest gaiter may be used dry or soaked with a liquid for a day or longer. The gaiter is attached on the horse's leg from the fetlock up by two perpendicular hook and loop fasteners. The horse gaiter is distinguished for its triple layered structure and the use thereof in a different part of the leg.

U.K. Patent Application No. 2,241,632 A published on Sep. 11, 1991, for John E. Salter describes a leg protector extending from the fetlock to the knee or hock of horses. The boot has an inner layer made of nylon fabric, a neoprene, soft rubber or foam layer, an aramid fiber layer, and an outer polyvinylchloride coated layer. The boot is fastened with hook and loop straps. The boot is distinguishable for its multiple protective layers.

None of the above inventions and patents, taken either singly or in combination, is seen to describe the instant invention as claimed.

SUMMARY OF THE INVENTION

The aqua boot for horses is a device which is designed for rehydration of a horse's hoof in order to prevent excessive dryness and cracking of the hoof. The boot is a moisture supplying foam or sponge wrap for attaching to a dehydrated hoof of a horse. The porous element is adhered to a rubber or vinyl backing material strip, coextensive in area, with mating strips of hook and loop fastening material attached to opposite ends of the boot in order to wrap around the hoof. The foam or sponge layer is sculptured to form an upper shoulder for conforming to the top of the hoof. A plurality of apertures are formed in both regions of the foam or sponge layer. The porous layer is soaked in water or other moisturizing liquid, lotion or gel, and wrapped about the hoof with the sponge layer in contact with the hoof. Cold water or ice can be added to the rehabilitation wrap to inhibit the circulation of the blood during an indicated laminitus of the hooves.

Accordingly, it is a principal object of the invention to provide a rehabilitative wrap for rehydrating a horses hoof.

It is another object of the invention to provide a wrap for rehydrating a horse's hoof comprising a sculptured and apertured wet sponge or foam wrap with a rubber or vinyl backing.

It is a further object of the invention to provide a rehabilitative wet sponge or foam wrap readily attachable to and removable from a horses hoof by hook and loop fastening.

Still another object of the invention is to provide a rehabilitative wet sponge or foam wrap with ice or cold water for a horse's dehydrated hoof for rehydration and to slow down the circulation for laminitus.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
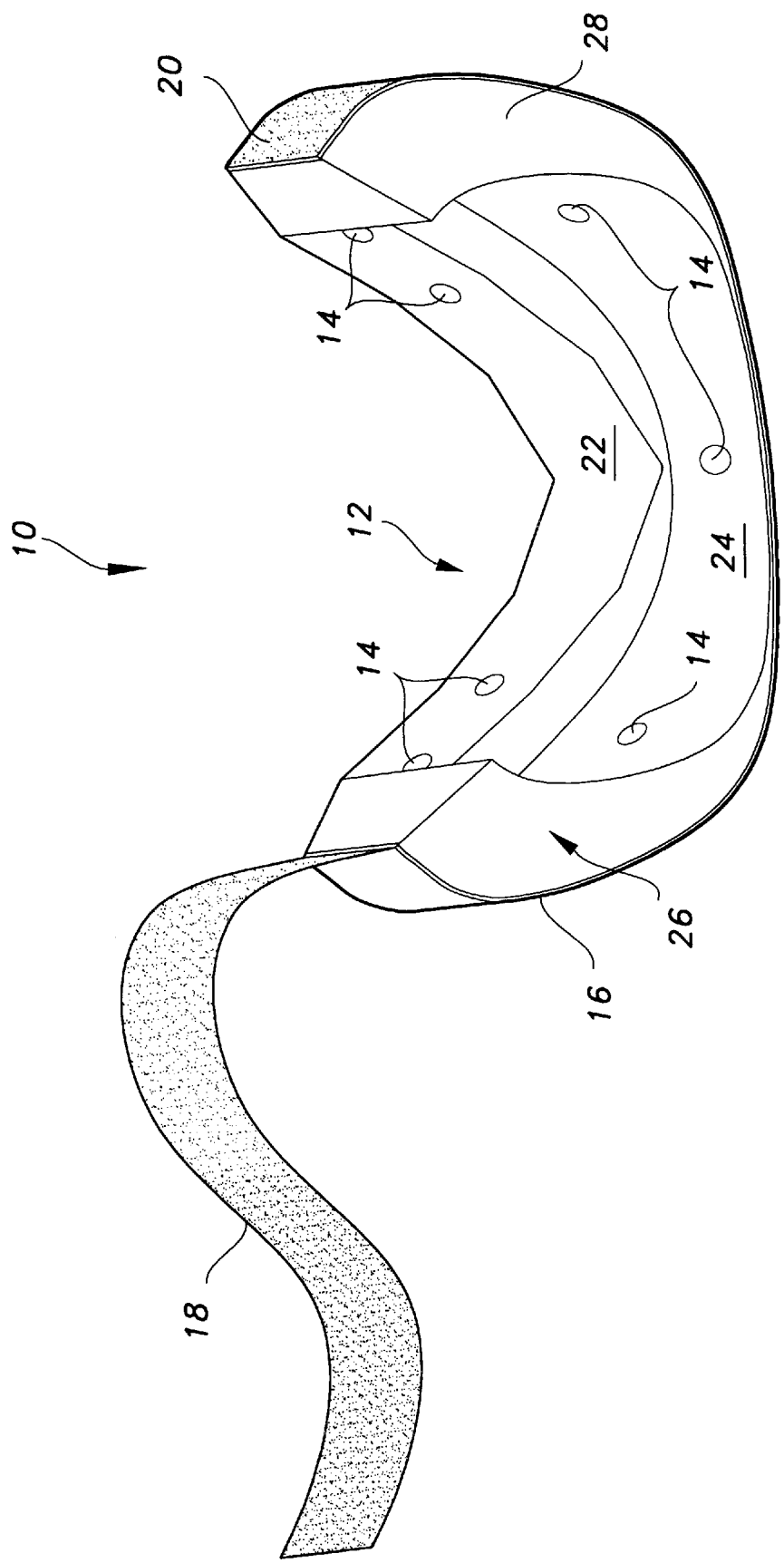
FIG. 1 is a perspective view of an open aqua boot with an apertured and sculptured sponge rubber or a plastic foam lined strip with a plastic backing attachable by hook and loop fastening elements according to the present invention.
Figure 2:
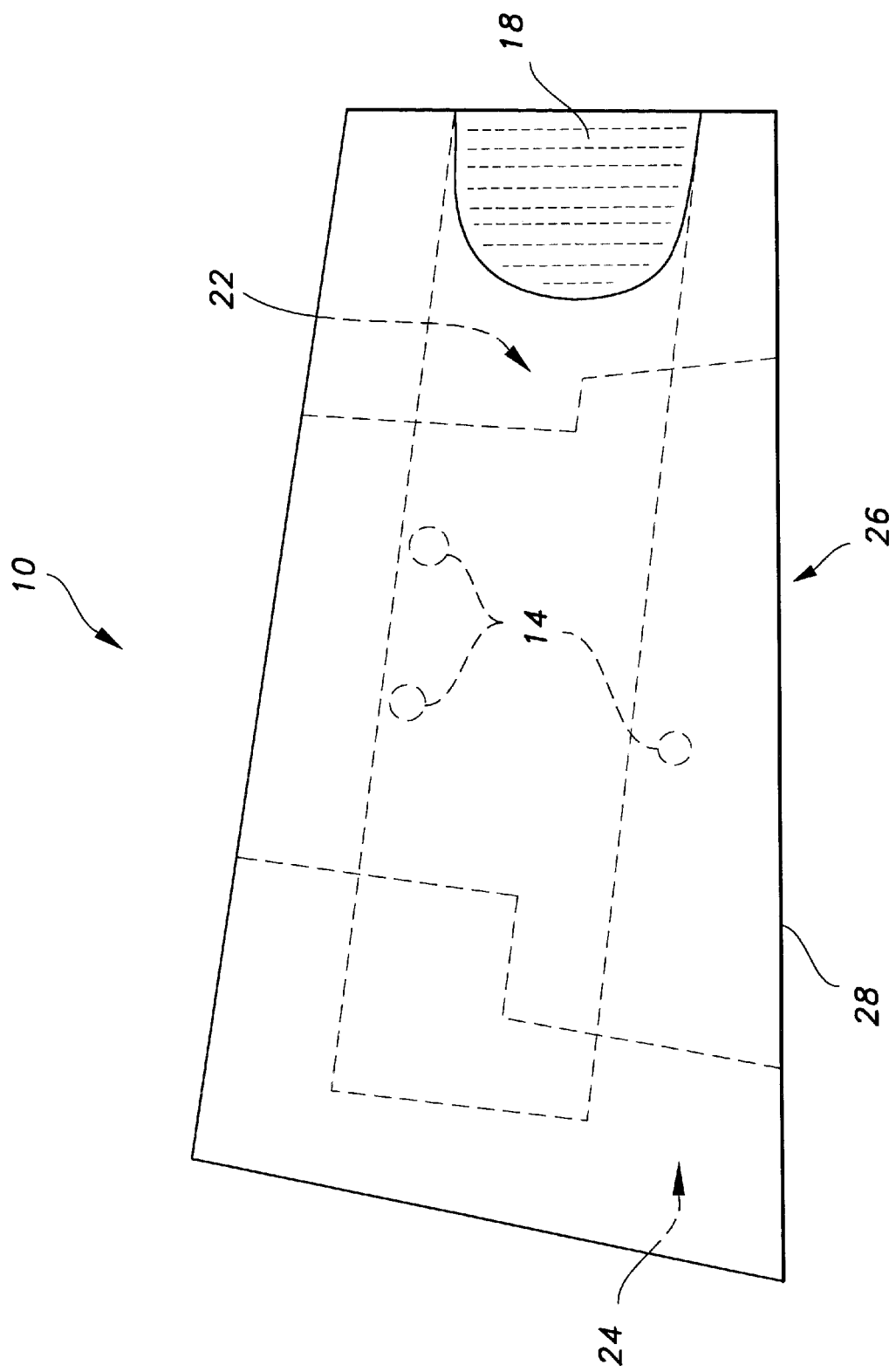
FIG. 2 is a side elevational view of the aqua boot showing the contoured inside wall of the sponge lining, apertures in the lining, and part of the external fastening in shadow according to the present invention.
Figure 3:
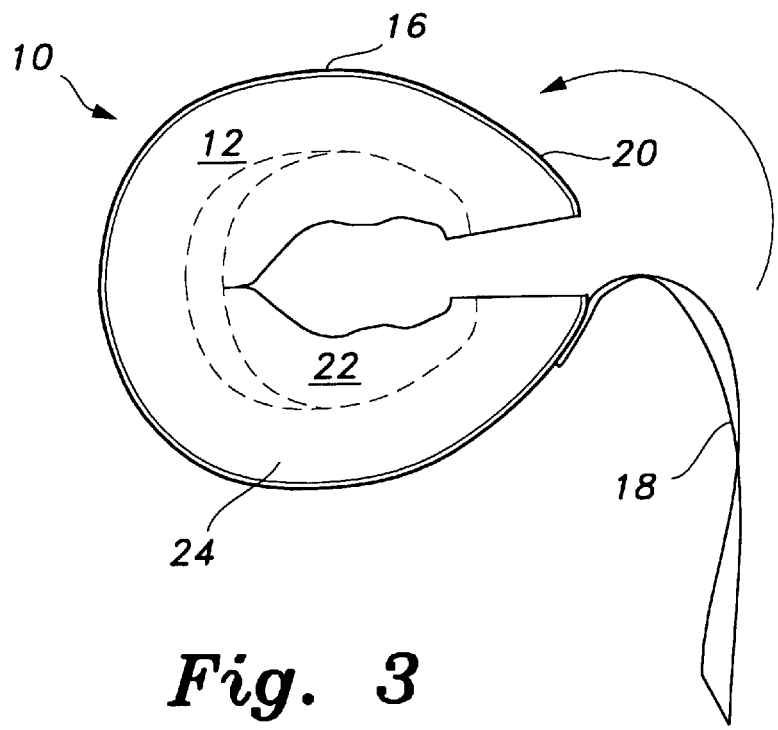
FIG. 3 is a top plan view of the aqua boot in an open position.
Figure 4:
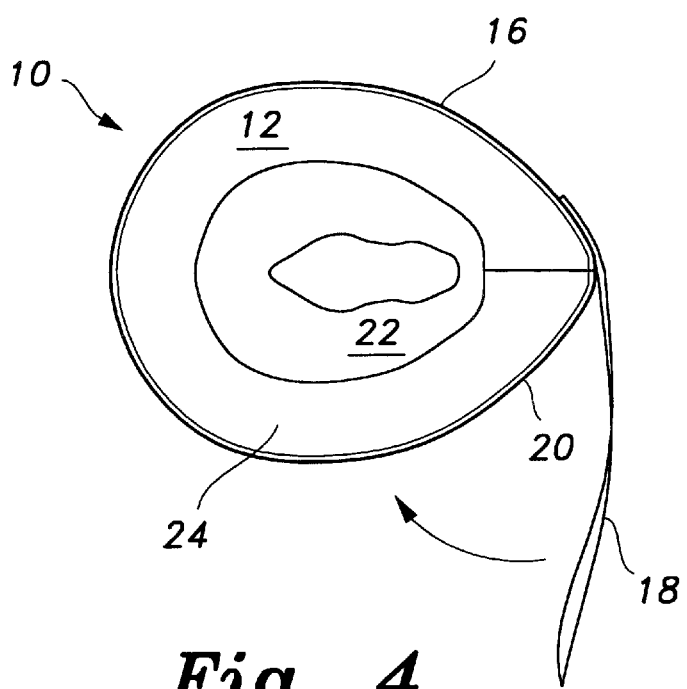
FIG. 4 is a bottom view of the aqua boot in a closed position with the hook and loop fastener yet to be fastened.

The present invention is directed to the rehydration of dehydrated hooves of horses. In FIGS. 1 to 4, an aqua boot 10 is shown having a sculptured inner crown or coronet shaped layer 12 with tapered ends having apertures 14, and made of a rubber sponge or plastic foam material, an outer neoprene rubber or vinyl backing layer 16, and two rectangular end straps 18 and 20 which comprise a hook and loop fastener.

The boot 10 is sculptured to have a thicker upper layer 22 and a thinner lower layer 24 in order to conform to the physical shape of the hoof and leg, and aids to maintain the position of the boot 10 on the hoof. The widest portion of the boot 10 is in front and approximately 4 to 5 inches in width. The end portions of the boot 10 can be approximately 2 to 3 inches in width. The upper layer 22 can be approximately 2 inches in height. The thickness of the sponge or foam layer 12 is preferably 2 to 3 inches. The rubber or vinyl layer 16 is, preferably, $\frac{1}{16}$ inch in thickness. A plastic sponge material having a property of releasing water and the like liquid at a controlled rate is preferred. In order to prevent excessive water from flowing from the bottom surface 26 of the boot, a thin layer of a water repellent coating 28 such as a suitable adhesive is applied.

It is known that absorption of water prevents hooves from drying out to keep them elastic and supple. However, the coronet region is more apt to show dehydration and should be treated immediately and regularly. The aqua boot 10 also restores moisture to the perioplic corium, bulbs, hoof wall, and the plantar cushion or frog.

It has been determined that the aqua boot 10 saturated with water and applied to the hoof and coronet region for 10 minutes daily will hydrate the coronet region of the hoof in a reasonable time up to a year to avoid the cracking of the coronet region and causing the horse discomfiture by sloughing off. The application of ice or cold water to the aqua boot 10 have been shown to rehabilitate hooves with laminitus.

It should be understood that the shape of the aqua boot 10 can be readily configured to fit only the sides of the hoof and to cover the dehydrated coronet region. It is contemplated that other medicinal substances can be used and several sizes of the aqua boot 10 can be prepared to accommodate the fitting of any size hoof. Furthermore, the aqua boot 10 can be left on dry to protect the hoof during traveling, in a trailer, for example.

The aqua boot renders it unnecessary to water the hooves with a hose, to add messy hoof oils or utilize mud holes to accomplish the hydration of the hooves. Another advantage lies in the economic saving of farrier costs by the use of the aqua boot.

It is to be understood that the present invention is not limited to the embodiments described above, but encompasses any and all embodiments within the scope of the following claims.

I claim:

1. An aqua boot for rehabilitative hydration of a horses hoof comprising:
    a layer of a plastic foam material having sculptured and apertured sides with an inner upper shoulder and narrow ends, wherein said foam layer has a bottom coating of a waterproof adhesive;
    a backing layer of rubber or vinyl commensurate in size with said foam layer; and
    strap means positioned at each narrow end for fastening the aqua boot around a horses hoof;
    whereby the application of water or ice to the foam layer rehydrates the coronet region and the hoof.

2. The aqua boot according to claim 1, wherein said foam layer is configured and structured to have the property of releasing water at a controlled rate.

3. The aqua boot according to claim 2, said foam layer further comprising means defining a plurality of apertures therein for assisting in moisture release from said foam layer.

4. The aqua boot according to claim 1, wherein said strap means includes hook and loop fastening material.

5. An aqua boot for rehabilitative hydration of a horses hoof comprising:

a layer of a plastic foam material having sculptured and apertured sides with an inner upper shoulder and narrow ends, said foam layer having a bottom coating of a waterproof adhesive and being configured and structured to have the property of releasing water at a controlled rate;

means defining a plurality of apertures therein for assisting in moisture release from said foam layer;

a backing layer of rubber or vinyl commensurate in size with said form layer; and strap means positioned at each narrow end for fastening the aqua boot around a horses hoof;

whereby the application of water or ice to the foam layers rehydrates the coronet region and the hoof.

6. The aqua boot according to claim 5, wherein said strap means includes hook and loop fastening material.

* * * * *